(12) United States Patent
Yang et al.

(10) Patent No.: US 7,950,108 B2
(45) Date of Patent: May 31, 2011

(54) CASTOR THAT IS BRAKED AND POSITIONED SIMULTANEOUSLY

(75) Inventors: Sung-Wang Yang, Tainan Hsien (TW); Ming-Hsien Lin, Yongkang (TW); Po-Lu Chen, Yongkang (TW)

(73) Assignee: Sunny Castors Co., Ltd., Tainan Hsien (TW)

( * ) Notice: Subject to any disclaimer, the term of this patent is extended or adjusted under 35 U.S.C. 154(b) by 338 days.

(21) Appl. No.: 12/264,405

(22) Filed: Nov. 4, 2008

(65) Prior Publication Data
US 2010/0107361 A1    May 6, 2010

(51) Int. Cl.
*A47B 91/00* (2006.01)
(52) U.S. Cl. .............. 16/47; 16/35 R; 188/1.12
(58) Field of Classification Search ............... 16/18 R, 16/45–48, 35 R; 188/1.12, 69
See application file for complete search history.

(56) References Cited

U.S. PATENT DOCUMENTS

| | | | | | |
|---|---|---|---|---|---|
| 5,368,133 | A | * | 11/1994 | Yang | 188/1.12 |
| 5,617,934 | A | * | 4/1997 | Yang | 188/1.12 |
| 5,632,360 | A | * | 5/1997 | Melara | 188/1.12 |
| 5,988,323 | A | * | 11/1999 | Chu | 188/1.12 |
| 6,360,851 | B1 | * | 3/2002 | Yang | 188/1.12 |
| 6,619,438 | B1 | * | 9/2003 | Yang | 188/1.12 |
| 6,662,404 | B1 | * | 12/2003 | Stroh et al. | 16/35 R |
| 6,725,501 | B2 | * | 4/2004 | Harris et al. | 16/35 R |
| 7,707,686 | B2 | * | 5/2010 | Chou | 16/35 R |

* cited by examiner

*Primary Examiner* — William L. Miller
(74) *Attorney, Agent, or Firm* — Alan Kamrath; Kamrath & Associates P.A.

(57) ABSTRACT

A castor includes a suspension unit, a castor body, a wheel unit, and a brake unit. The suspension unit includes an upright fixing bolt and a locking member. The wheel unit includes two rollers. The brake unit includes a positioning block, a sliding block, a biasing member, a drive member, and a braking pin. Thus, when the drive member of the brake unit is pressed, each of the rollers of the wheel unit is braked by and locked onto the castor body, and the castor body is locked onto the fixing bolt simultaneously, thereby locking the castor exactly and stably.

20 Claims, 10 Drawing Sheets

CASTOR THAT IS BRAKED AND POSITIONED SIMULTANEOUSLY

BACKGROUND OF THE INVENTION

1. Field of the Invention

The present invention relates to a castor and, more particularly, to a castor for a chair, hand cart, sick bed and the like.

2. Description of the Related Art

A chair comprises a stand and a plurality of castors mounted on the bottom of the stand. A conventional chair castor comprises an upright fixing bolt mounted on the bottom of the stand of the chair, a castor body rotatably mounted on the fixing bolt, a wheel unit including two rollers each rotatably mounted on the castor body and each having a periphery formed with a plurality of locking grooves, and a brake unit including a pressing member pivotally mounted on the castor body and provided with a braking member that is movable into one of the locking grooves of each of the rollers of the wheel unit to lock each of the rollers of the wheel unit onto the castor body. Thus, when the pressing member of the brake unit is pressed, the braking member is movable into one of the locking grooves of each of the rollers of the wheel unit to lock each of the rollers of the wheel unit onto the castor body so as to lock the castor. However, the castor body is rotatable relative to the fixing bolt when each of the rollers of the wheel unit is locked onto the castor body, so that the wheel unit easily slips due to rotation the castor body relative to the fixing bolt, thereby causing inconvenience to a user.

BRIEF SUMMARY OF THE INVENTION

The primary objective of the present invention is to provide a castor that is braked and positioned simultaneously.

Another objective of the present invention is to provide a castor, wherein when the drive member of the brake unit is pressed, each of the rollers of the wheel unit is braked by and locked onto the castor body, and the castor body is locked onto the fixing bolt simultaneously, thereby locking the castor exactly and stably.

A further objective of the present invention is to provide a castor, wherein when the wheel unit is locked onto the castor body, the castor body is locked onto the suspension unit simultaneously so that the castor body will not be rotatable relative to the suspension unit when the wheel unit is locked onto the castor body to prevent the wheel unit from slipping freely, thereby enhancing the locking effect of the castor.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-7, a castor in accordance with the preferred embodiment of the present invention comprises a suspension unit 3, a castor body 1, a wheel unit 4, and a brake unit 2.

The suspension unit 3 includes an upright fixing bolt 31 and a locking member 32 secured on the fixing bolt 31. The locking member 32 of the suspension unit 3 has a bottom formed with a plurality of locking holes 321. The castor body 1 is rotatably mounted on the fixing bolt 31 of the suspension unit 3. The wheel unit 4 includes two rollers 41 each rotatably mounted on the castor body 1 and each having a side formed with a plurality of locking grooves 411.

The brake unit 2 includes a positioning block 23 movably mounted in the castor body 1 and movable to press the locking member 32 of the suspension unit 3 to lock the castor body 1 onto the locking member 32 of the suspension unit 3, a sliding block 22 movably mounted in the castor body 1 and combined with the positioning block 23 to move the positioning block 23 in the castor body 1, a biasing member 24 mounted in the castor body 1 and biased between the castor body 1 and the sliding block 22 to push the sliding block 22 outwardly relative to the positioning block 23, a drive member 21 pivotally mounted on the castor body 1 and abutting the sliding block 22 to push the sliding block 22 toward the positioning block 23, a braking pin 213 mounted on the drive member 21 to move with the drive member 21 and movable into one of the locking grooves 411 of each of the rollers 41 to brake and lock each of the rollers 41 of the wheel unit 4 onto the castor body 1, and a pivot pin 212 secured on the castor body 1 and extending through the drive member 21 so that the drive member 21 is pivotable on the castor body 1. The positioning block 23 of the brake unit 2 has a top formed with at least one locking pin 231 that is movable relative to the castor body 1 into one of the locking holes 321 of the locking member 32 to lock the positioning block 23 of the brake unit 2 and the castor body 1 onto the locking member 32 of the suspension unit 3.

Figure 1:
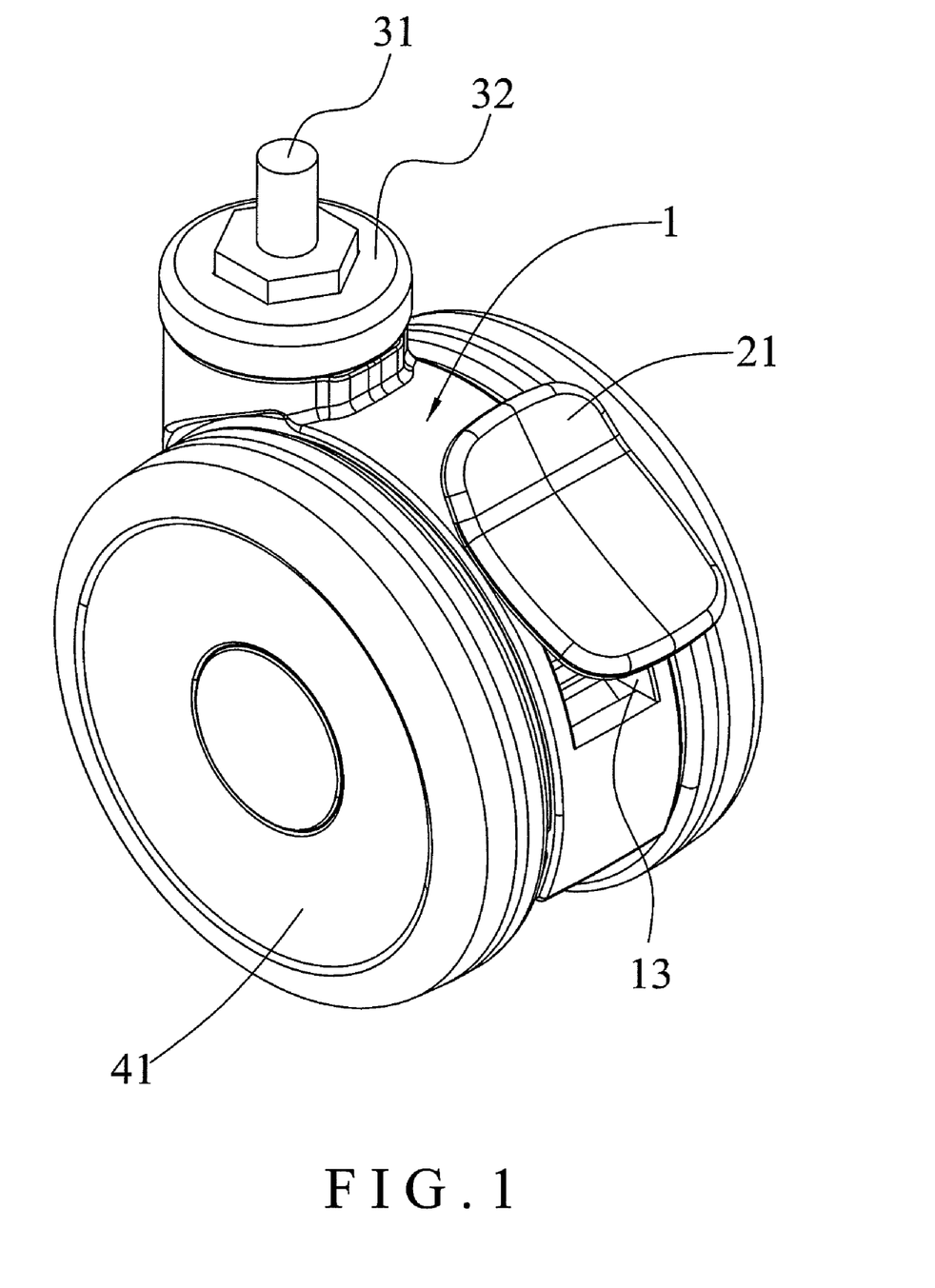
FIG. 1 is a perspective view of a castor in accordance with the preferred embodiment of the present invention.
Figure 2:
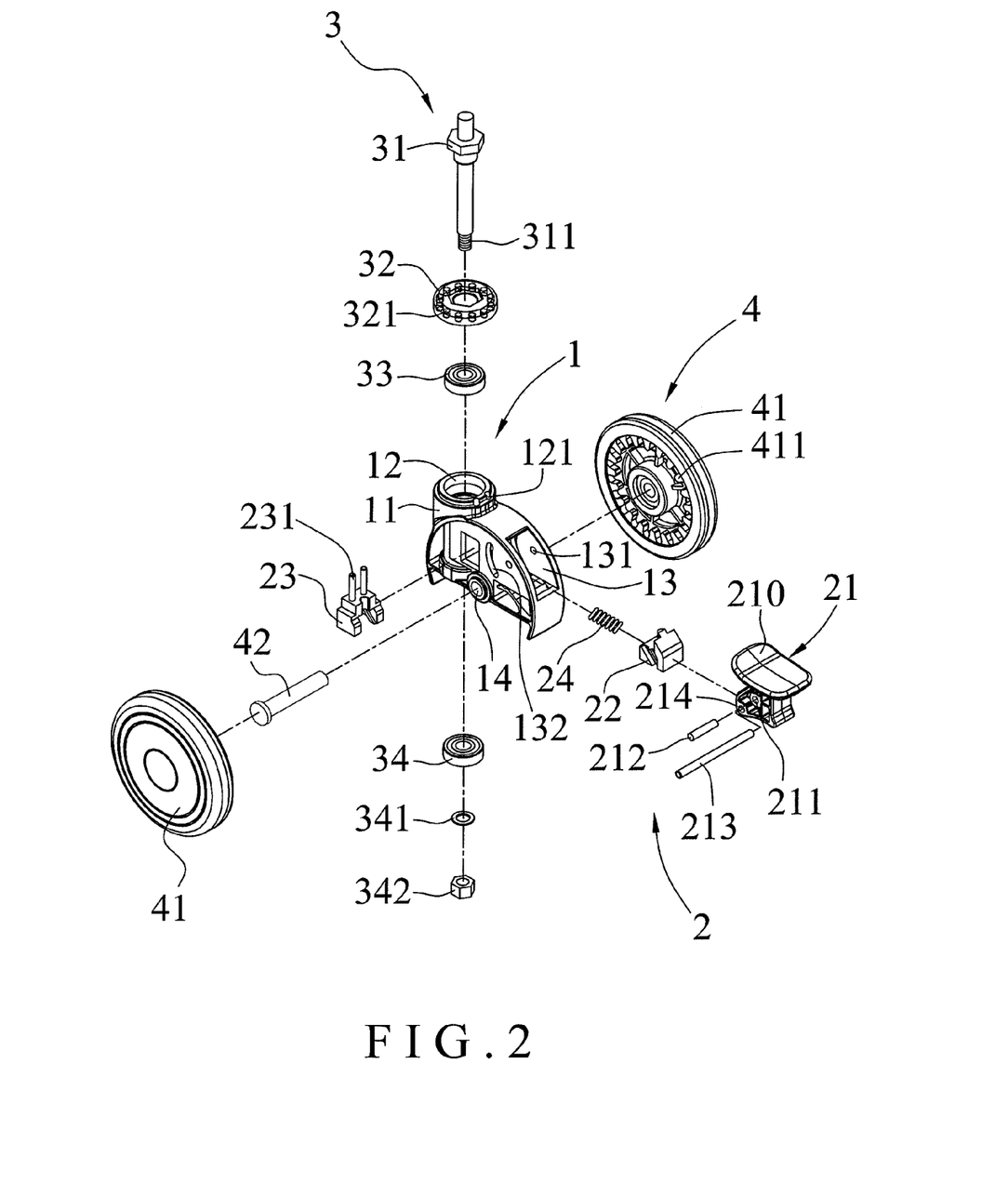
FIG. 2 is an exploded perspective view of the castor as shown in FIG. 1.
Figure 3:
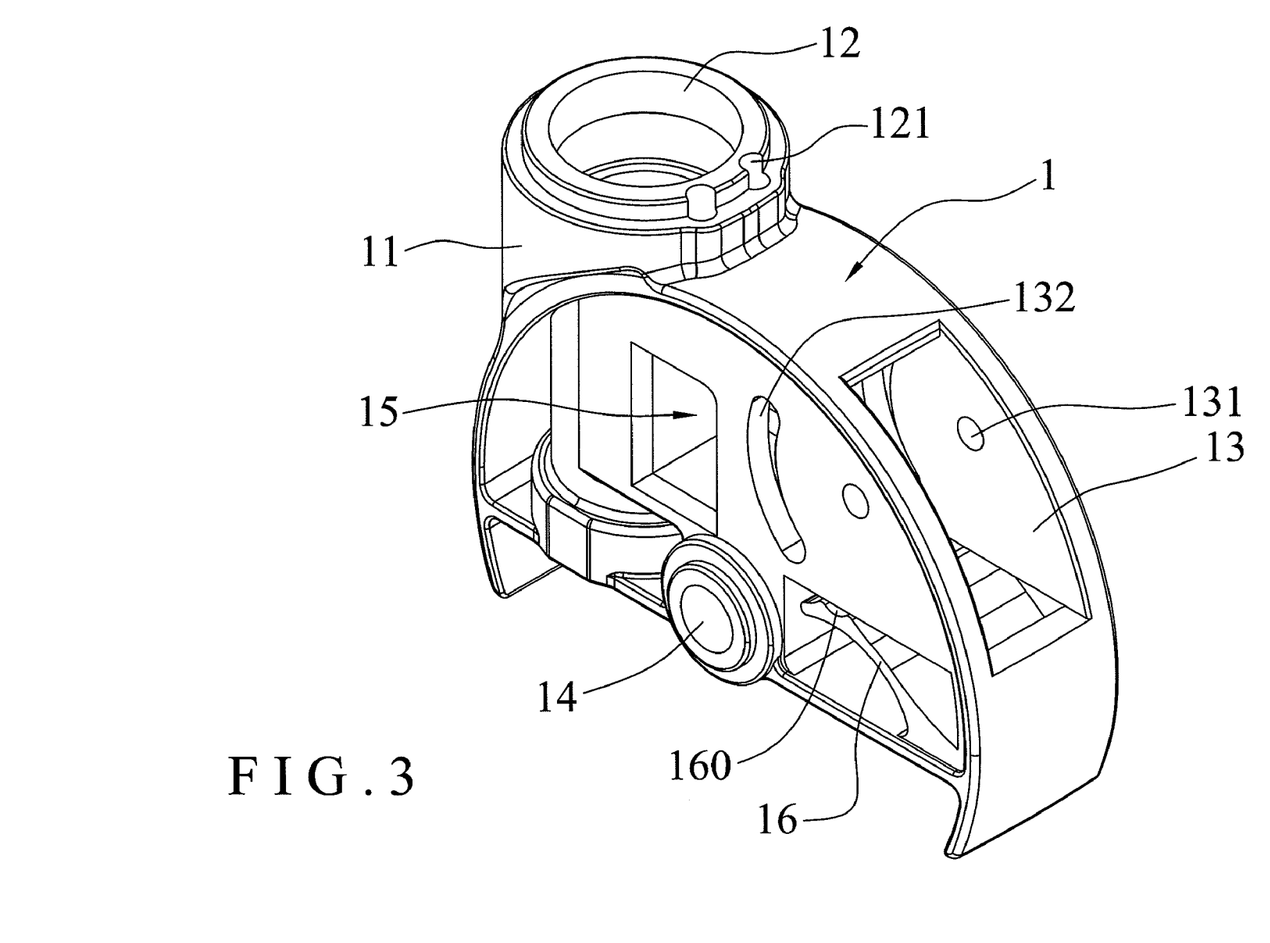
FIG. 3 is a perspective view of a castor body of the castor as shown in FIG. 2.

The castor body 1 has a central portion formed with a shaft hole 14. The castor body 1 has a first end formed with an upright mounting post 11 having an inside formed with a rotation hole 12 rotatably mounted on the fixing bolt 31 of the suspension unit 3 and a periphery formed with at least one mounting hole 121 for mounting the locking pin 231 of the positioning block 23. The mounting post 11 of the castor body 1 is located under the locking member 32 of the suspension unit 3. The castor body 1 has a second end formed with an elongated mounting chamber 13 for mounting the brake unit 2. The mounting chamber 13 of the castor body 1 is connected to the mounting hole 121 of the mounting post 11. The second end of the castor body 1 has two opposite sidewalls each formed with a fixing hole 131 connected to the mounting chamber 13 to fix the pivot pin 212 and an arcuate guide slot 132 connected to the mounting chamber 13 to guide movement of the braking pin 213. The castor body 1 has a side formed with a passage 15 connected to the mounting chamber 13 to allow passage of the positioning block 23. The castor body 1 is formed with an elastic positioning plate 16 extending into the mounting chamber 13 to position the drive member 21 of the brake unit 2 temporarily. The positioning plate 16 of the castor body 1 has a distal end formed with an arcuate positioning recess 160.

The wheel unit 4 further includes a wheel axle 42 rotatably mounted in the shaft hole 14 of the castor body 1 and having two opposite ends each mounted in a respective one of the rollers 41.

Figure 6:
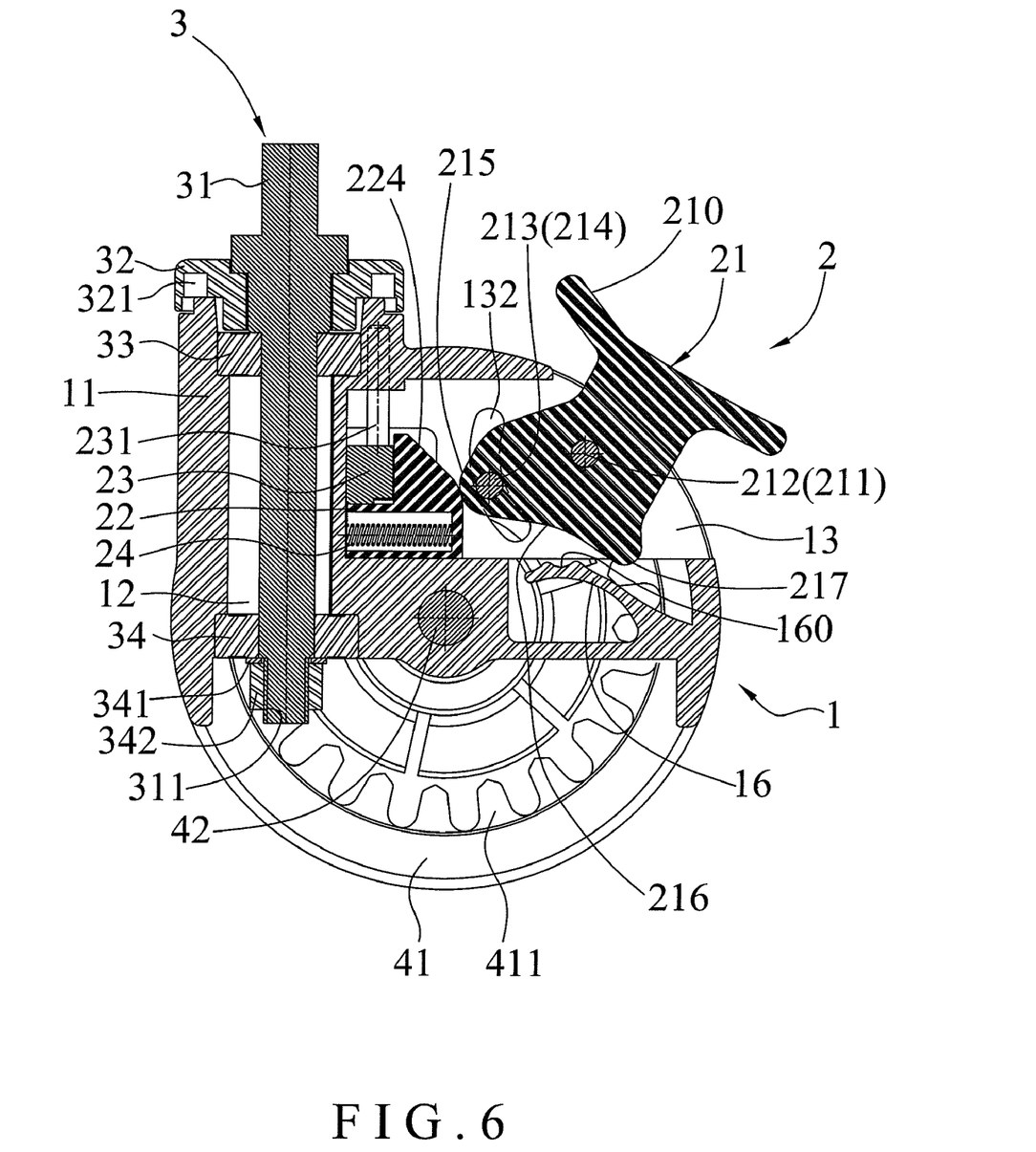
FIG. 6 is a side cross-sectional view of the castor as shown in FIG. 1.

The suspension unit 3 further includes an upper bearing 33 mounted on the fixing bolt 31 of the suspension unit 3 and located between a stepped upper end of the rotation hole 12 of the castor body 1 and a stepped upper end of the fixing bolt 31 of the suspension unit 3, a lower bearing 34 mounted on the fixing bolt 31 of the suspension unit 3 and having a first side abutting a stepped lower end of the rotation hole 12 of the castor body 1, a nut 342 screwed onto a threaded lower end 311 of the fixing bolt 31 to retain the castor body 1 on the fixing bolt 31 of the suspension unit 3, and a washer 341 mounted on the fixing bolt 31 of the suspension unit 3 and located between a second side of the lower bearing 34 and the nut 342. The fixing bolt 31 of the suspension unit 3 extends through the locking member 32 which is located between the fixing bolt 31 and the mounting post 11 of the castor body 1.

Figure 5:
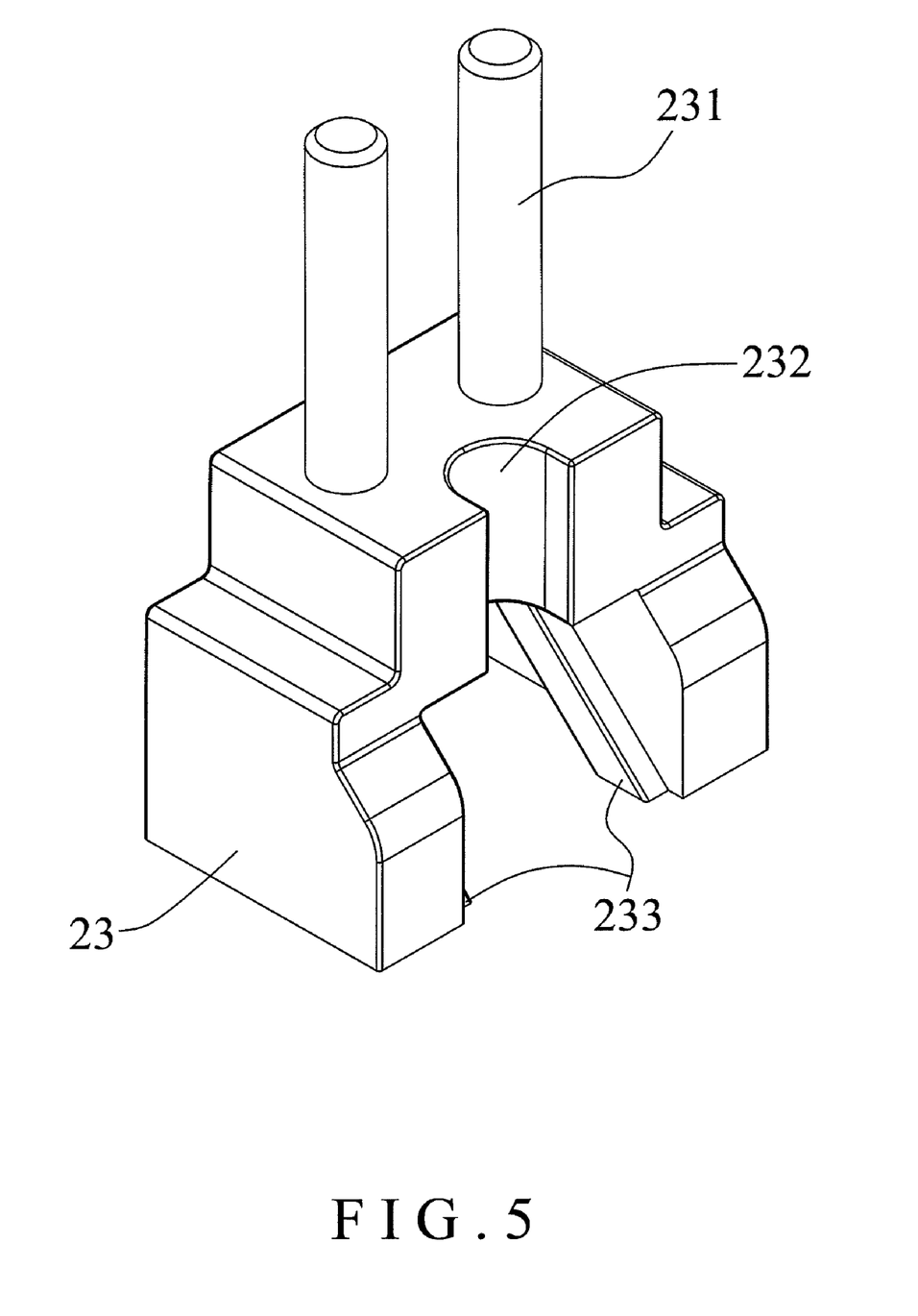
FIG. 5 is a perspective view of a positioning block of the castor as shown in FIG. 4.

The positioning block 23 of the brake unit 2 is movable upward and downward relative to the castor body 1. The positioning block 23 of the brake unit 2 has a substantially inverted U-shaped cross-sectional profile. The positioning block 23 of the brake unit 2 has two opposite inner faces each formed with an oblique slide 233 and has a side formed with an upright guide slot 232 located between the oblique slide 233 and the locking pin 231.

Figure 4:
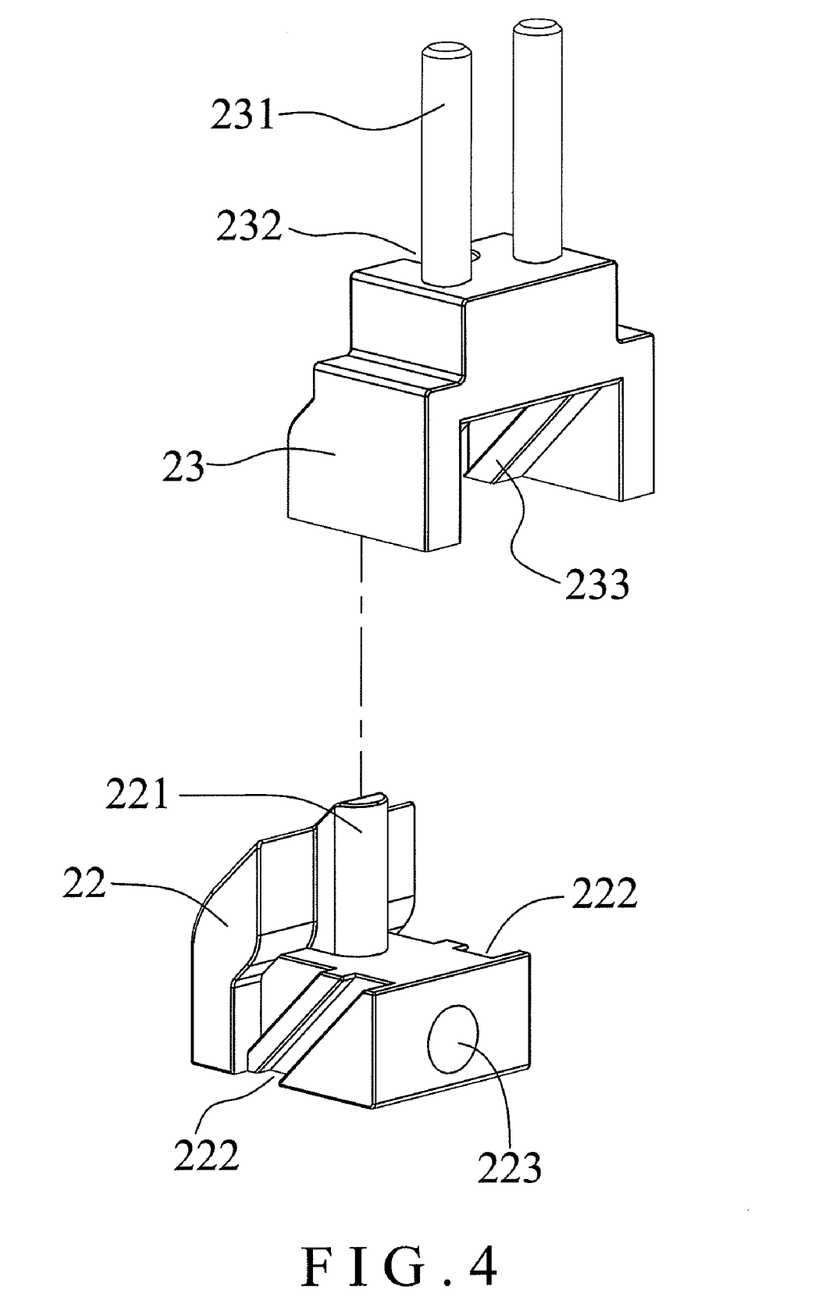
FIG. 4 is a partially exploded perspective view of the castor as shown in FIG. 2.

The sliding block 22 of the brake unit 2 is movable forward and backward relative to the castor body 1 and is movable relative to the positioning block 23. The sliding block 22 of the brake unit 2 is driven by the drive member 21 to move toward the positioning block 23 and is driven by the biasing member 24 to move outwardly relative to the positioning block 23. The sliding block 22 of the brake unit 2 has two opposite outer faces each formed with an oblique slideway 222 slidably mounted on the respective oblique slide 233 of the positioning block 23 and has a top formed with an upright guide rail 221 on which the guide slot 232 of the positioning block 23 is movable. The sliding block 22 of the brake unit 2 has an end face formed with a receiving hole 223 to receive the biasing member 24.

The drive member 21 of the brake unit 2 has a first end formed with a pressing portion 210 protruding outwardly from the mounting chamber 13 of the castor body 1, a second end formed with a fixing bore 214 to fix the braking pin 213 and a mediate portion form with a pivot bore 211 located between the pressing portion 210 and the fixing bore 214 and pivotally mounted on the pivot pin 212. The second end of the drive member 21 has an end face formed with an arcuate push portion 215, a concave receiving portion 216 located beside the push portion 215 and a positioning portion 217 located beside the receiving portion 216.

Thus, the drive member 21 of the brake unit 2 is movable upward relative to the castor body 1 to a first position as shown in FIG. 6 where the braking pin 213 is movable downward to detach from one of the locking grooves 411 of each of the rollers 41 to unlock each of the rollers 41 of the wheel unit 4 from the castor body 1, while the push portion 215 of the drive member 21 abuts and pushes a ramp 224 of the sliding block 22 to move the sliding block 22 toward the positioning block 23, so that the positioning block 23 is movable downward relative to the castor body 1 by an oblique movement between the oblique slideway 222 of the sliding block 22 and the respective oblique slide 233 of the positioning block 23, and the locking pin 231 of the positioning block 23 is detached from one of the locking holes 321 of the locking member 32 to unlock the positioning block 23 of the brake unit 2 and the castor body 1 from the locking member 32 of the suspension unit 3. At the same time, the positioning portion 217 of the drive member 21 is movable to detach from the positioning recess 160 of the positioning plate 16 to unlock the drive member 21 of the brake unit 2 from the positioning plate 16 of the castor body 1.

Figure 7:
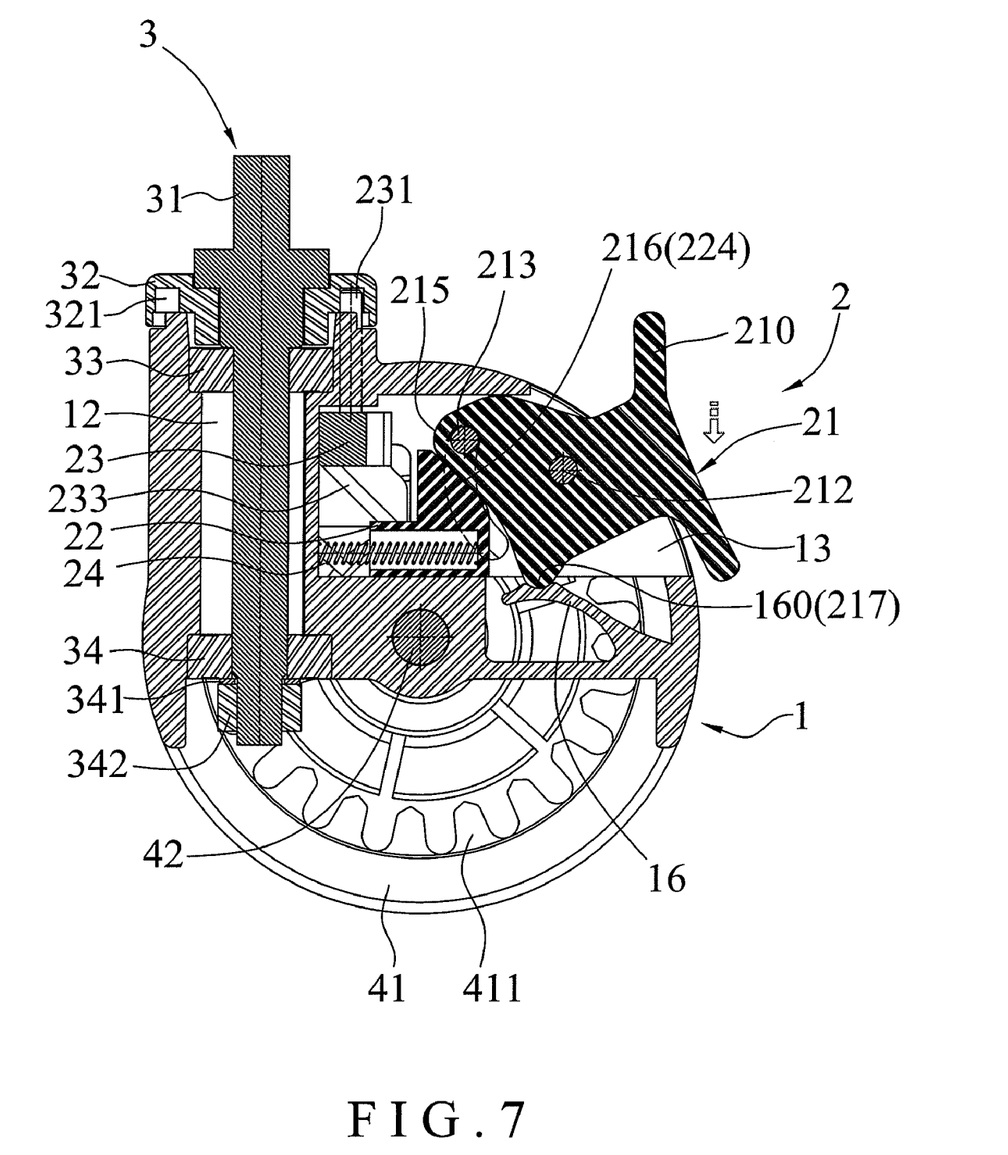
FIG. 7 is a schematic operational view of the castor as shown in FIG. 6.

In addition, the drive member 21 of the brake unit 2 is movable downward relative to the castor body 1 to a second position as shown in FIG. 7 where the braking pin 213 is movable upward into one of the locking grooves 411 of each of the rollers 41 to lock each of the rollers 41 of the wheel unit 4 onto the castor body 1, while the sliding block 22 of the brake unit 2 is driven by a restoring force of the biasing member 24 to move outwardly relative to the positioning block 23, and the ramp 224 of the sliding block 22 is movable to abut the receiving portion 216 of the drive member 21, so that the positioning block 23 is movable upward relative to the castor body 1 by an oblique movement between the oblique slideway 222 of the sliding block 22 and the respective oblique slide 233 of the positioning block 23, and the locking pin 231 of the positioning block 23 is movable into one of the locking holes 321 of the locking member 32 to lock the positioning block 23 of the brake unit 2 and the castor body 1 onto the locking member 32 of the suspension unit 3. At the same time, the positioning portion 217 of the drive member 21 is movable into the positioning recess 160 of the positioning plate 16 to lock the drive member 21 of the brake unit 2 onto the positioning plate 16 of the castor body 1.

In operation, referring to FIGS. 6 and 7 with reference to FIGS. 1-5, when the pressing portion 210 of the drive member 21 is pressed to move the drive member 21 of the brake unit 2 downward from the first position as shown in FIG. 6 to the second position as shown in FIG. 7, the braking pin 213 is movable upward into one of the locking grooves 411 of each of the rollers 41 to lock each of the rollers 41 of the wheel unit 4 onto the castor body 1, while the sliding block 22 of the brake unit 2 is driven by a restoring force of the biasing member 24 to move outwardly relative to the positioning block 23, and the ramp 224 of the sliding block 22 is movable to abut the receiving portion 216 of the drive member 21, so that the positioning block 23 is movable upward relative to the castor body 1 by an oblique movement between the oblique slideway 222 of the sliding block 22 and the respective oblique slide 233 of the positioning block 23, and the locking pin 231 of the positioning block 23 is movable into one of the locking holes 321 of the locking member 32 to lock the positioning block 23 of the brake unit 2 and the castor body 1 onto the locking member 32 of the suspension unit 3. At the same time, the positioning portion 217 of the drive member 21 is movable into the positioning recess 160 of the positioning plate 16 to lock the drive member 21 of the brake unit 2 onto the positioning plate 16 of the castor body 1. Thus, each of the rollers 41 of the wheel unit 4 is braked by and locked onto the castor body 1, while the castor body 1 is locked onto the fixing bolt 31 by the locking member 32.

It is to be noted that, if the locking pin 231 of the positioning block 23 is not aligned with one of the locking holes 321 of the locking member 32, the castor body 1 is rotatable relative to the locking member 32 of the suspension unit 3 to slightly move the locking pin 231 of the positioning block 23 to align with one of the locking holes 321 of the locking member 32, so that the locking pin 231 of the positioning block 23 is pushed by the restoring force of the biasing member 24 and is locked in one of the locking holes 321 of the locking member 32.

On the contrary, when the pressing portion 210 of the drive member 21 is pressed to move the drive member 21 of the brake unit 2 downward from the second position as shown in FIG. 7 to the first position as shown in FIG. 6, the braking pin 213 is movable downward to detach from one of the locking grooves 411 of each of the rollers 41 to unlock each of the rollers 41 of the wheel unit 4 from the castor body 1, while the push portion 215 of the drive member 21 abuts and pushes the ramp 224 of the sliding block 22 to move the sliding block 22 toward the positioning block 23, so that the positioning block 23 is movable downward relative to the castor body 1 by an oblique movement between the oblique slideway 222 of the sliding block 22 and the respective oblique slide 233 of the positioning block 23, and the locking pin 231 of the positioning block 23 is detached from one of the locking holes 321 of the locking member 32 to unlock the positioning block 23 of the brake unit 2 and the castor body 1 from the locking member 32 of the suspension unit 3. At the same time, the positioning portion 217 of the drive member 21 is movable to detach from the positioning recess 160 of the positioning plate 16 to unlock the drive member 21 of the brake unit 2 from the positioning plate 16 of the castor body 1.

Accordingly, when the drive member 21 of the brake unit 2 is pressed, each of the rollers 41 of the wheel unit 4 is braked by and locked onto the castor body 1, and the castor body 1 is locked onto the fixing bolt 31 simultaneously, thereby locking the castor exactly and stably. In addition, when the wheel unit 4 is locked onto the castor body 1, the castor body 1 is locked onto the suspension unit 3 simultaneously so that the castor body 1 will not be rotatable relative to the suspension unit 3 when the wheel unit 4 is locked onto the castor body 1 to prevent the wheel unit 4 from slipping freely, thereby enhancing the locking effect of the castor.

Figure 8:
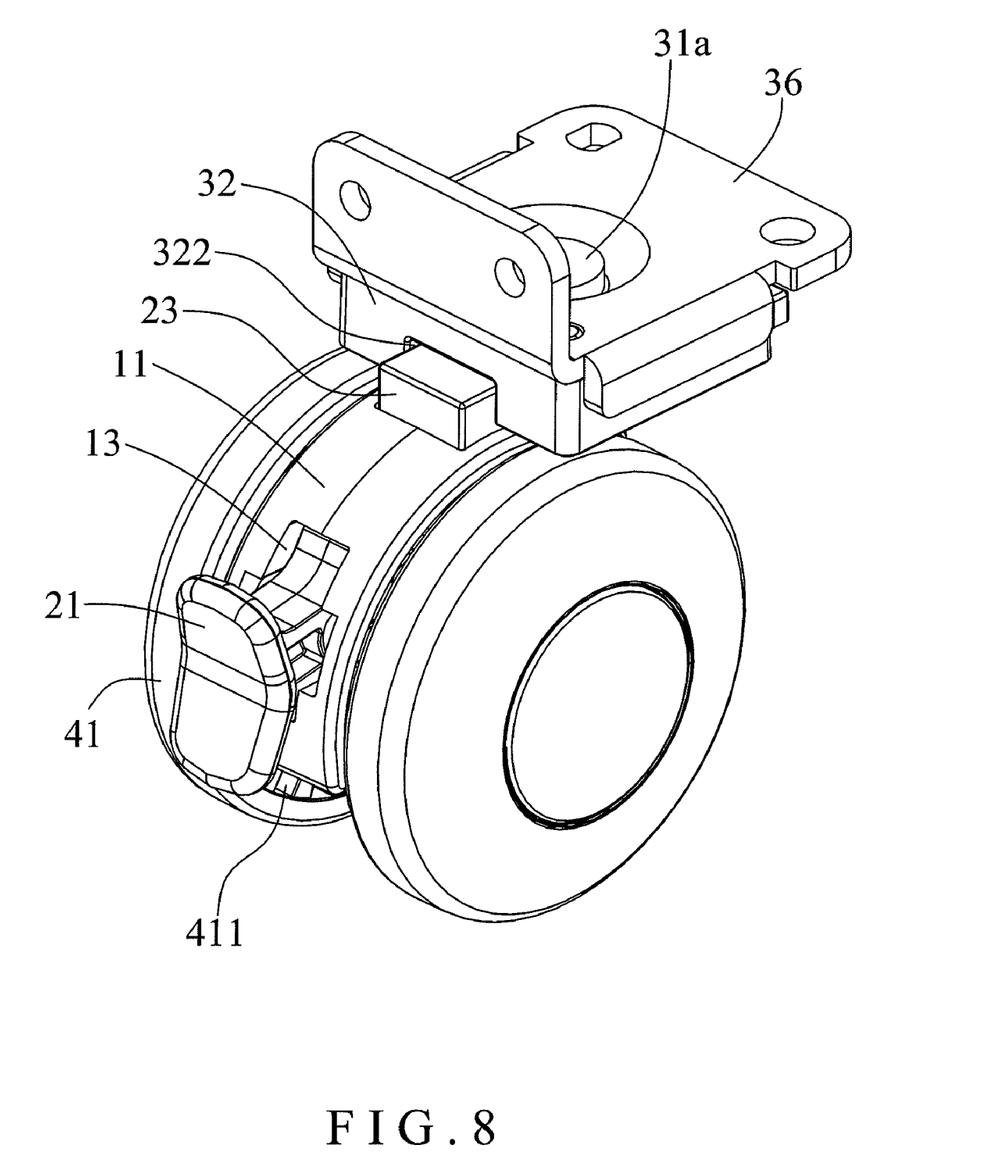
FIG. 8 is a perspective view of a castor in accordance with another preferred embodiment of the present invention.
Figure 9:
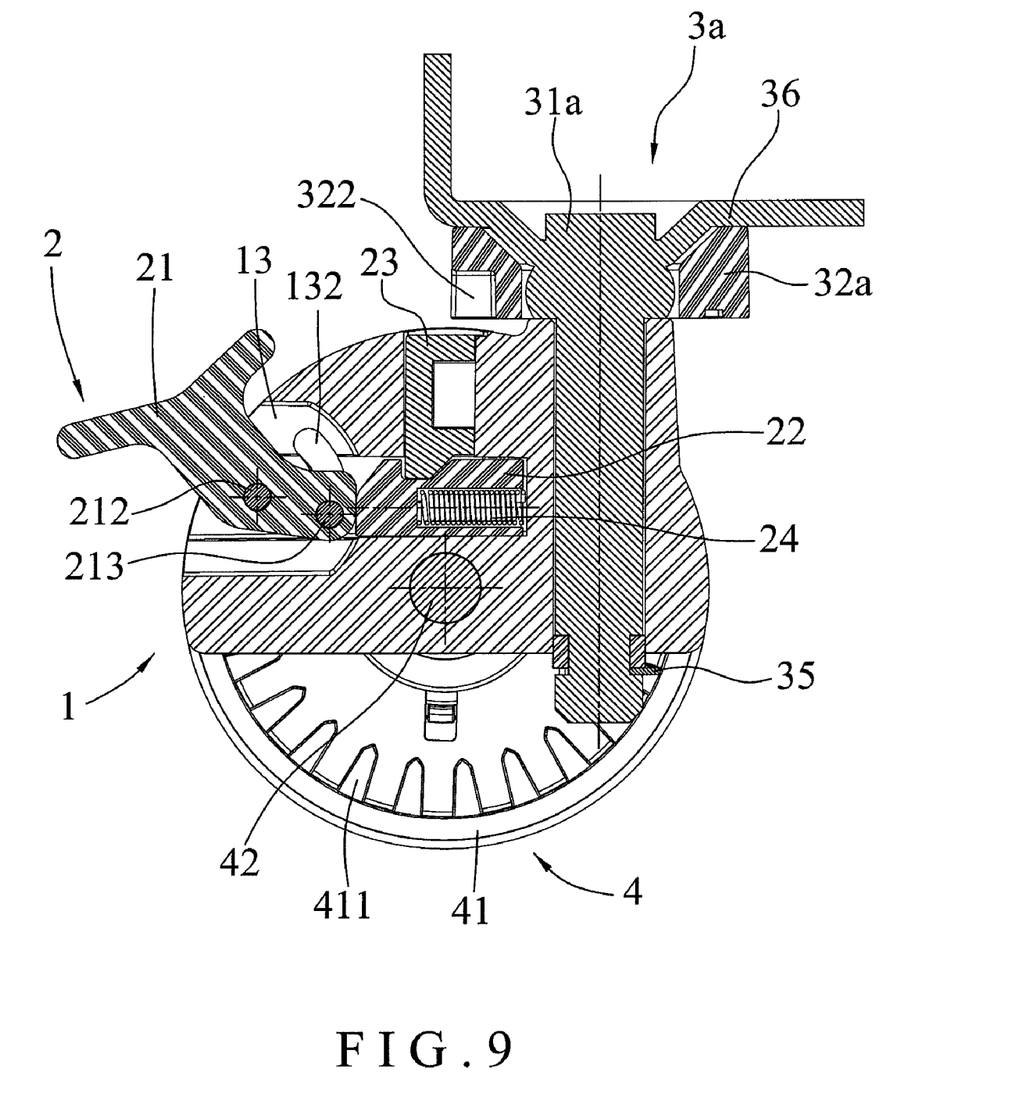
FIG. 9 is a side cross-sectional view of the castor as shown in FIG. 8.
Figure 10:
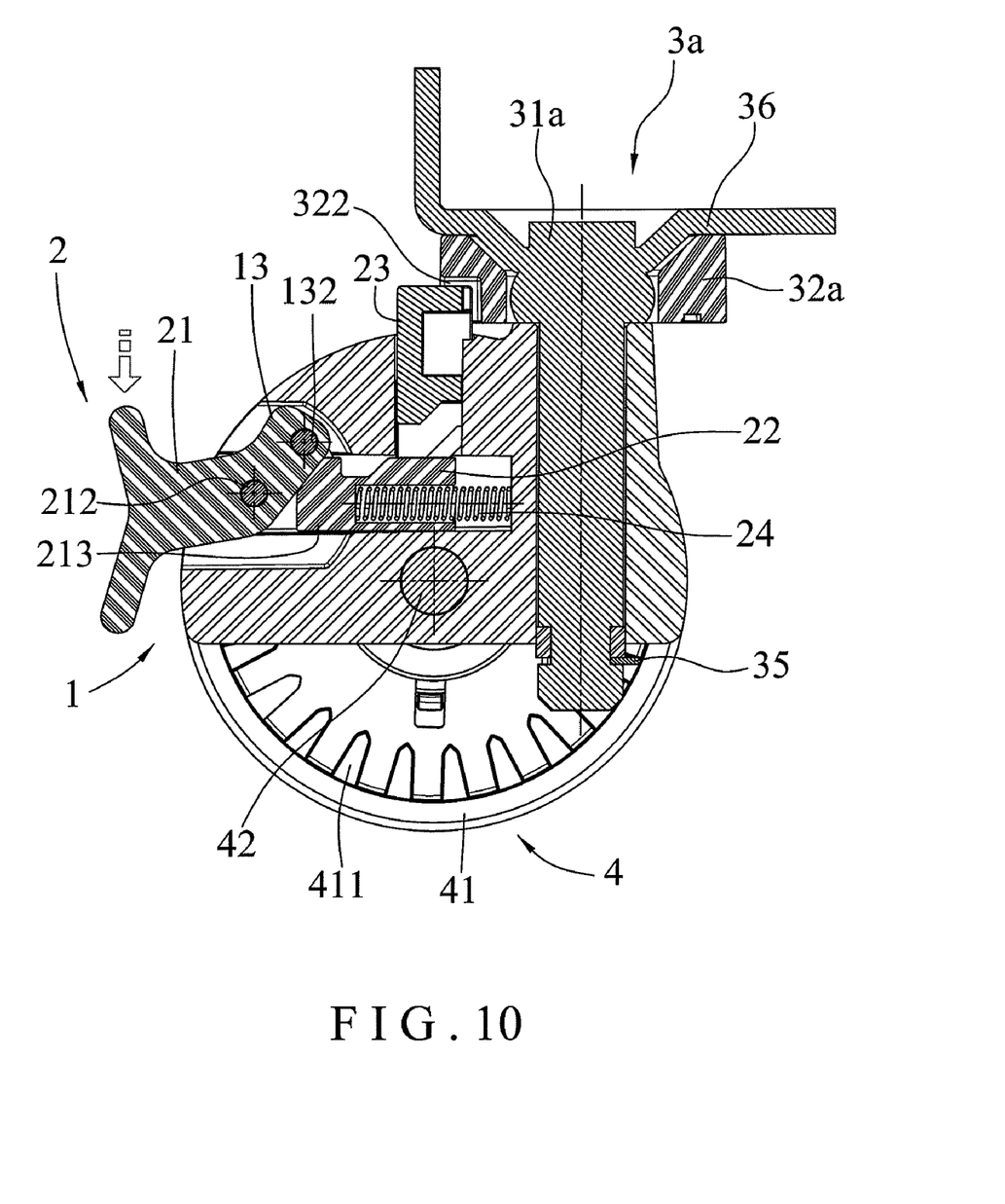
FIG. 10 is a schematic operational view of the castor as shown in FIG. 9.

Referring to FIGS. 8-10, the fixing bolt 31a has a top formed with a substantially L-shaped support bracket 36. The locking member 32a has a bottom formed with a substantially inverted L-shaped locking recess 322, and the positioning block 23 is movable relative to the castor body 1 into the locking recess 322 of the locking member 32a to lock the positioning block 23 and the castor body 1 onto the locking member 32a. The fixing bolt 31a has a stepped upper end abutting the top of the castor body 1, and the suspension unit 3a further includes a substantially C-shaped snap ring 35 snapped onto the lower end of the fixing bolt 31a and abutting the bottom of the castor body 1 to attach the castor body 1 to the fixing bolt 31a.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A castor, comprising a suspension unit, a castor body, a wheel unit, and a brake unit, wherein
the suspension unit includes an upright fixing bolt and a locking member secured on the fixing bolt;
the castor body is rotatably mounted on the fixing bolt of the suspension unit;
the wheel unit includes two rollers each rotatably mounted on the castor body and each having a side formed with a plurality of locking grooves;
the brake unit includes a positioning block movably mounted in the castor body and movable to press the locking member of the suspension unit to lock the castor body onto the locking member of the suspension unit, a sliding block movably mounted in the castor body and combined with the positioning block to move the positioning block in the castor body, a biasing member mounted in the castor body and biased between the castor body and the sliding block to push the sliding block outwardly relative to the positioning block, a drive member pivotally mounted on the castor body and abutting the sliding block to push the sliding block toward the positioning block, and a braking pin mounted on the drive member to move with the drive member and movable into one of the locking grooves of each of the rollers to brake and lock each of the rollers of the wheel unit onto the castor body.

2. The castor of claim 1, wherein
the positioning block of the brake unit has two opposite inner faces each formed with an oblique slide;
the sliding block of the brake unit has two opposite outer faces each formed with an oblique slideway slidably mounted on the respective oblique slide of the positioning block.

3. The castor of claim 2, wherein
the locking member of the suspension unit has a bottom formed with a plurality of locking holes;
the positioning block of the brake unit has a top formed with at least one locking pin that is movable relative to the castor body into one of the locking holes of the locking member to lock the positioning block of the brake unit and the castor body onto the locking member of the suspension unit.

4. The castor of claim 3, wherein
the positioning block of the brake unit has a side formed with an upright guide slot;
the sliding block of the brake unit has a top formed with an upright guide rail on which the guide slot of the positioning block is movable.

5. The castor of claim 2, wherein
the locking member has a bottom formed with a substantially inverted L-shaped locking recess;
the positioning block is movable relative to the castor body into the locking recess of the locking member to lock the positioning block and the castor body onto the locking member.

6. The castor of claim 2, wherein the sliding block of the brake unit has an end face formed with a receiving hole to receive the biasing member.

7. The castor of claim 2, wherein
the positioning block of the brake unit is movable upward and downward relative to the castor body;
the sliding block of the brake unit is movable forward and backward relative to the castor body and is movable relative to the positioning block;
the sliding block of the brake unit is driven by the drive member to move toward the positioning block and is driven by the biasing member to move outwardly relative to the positioning block.

8. The castor of claim 3, wherein
the castor body has a first end formed with an upright mounting post having an inside formed with a rotation hole rotatably mounted on the fixing bolt of the suspension unit and a periphery formed with at least one mounting hole for mounting the locking pin of the positioning block;

the castor body has a second end formed with an elongated mounting chamber for mounting the brake unit.

9. The castor of claim 8, wherein the brake unit further includes a pivot pin secured on the castor body and extending through the drive member so that the drive member is pivotable on the castor body.

10. The castor of claim 9, wherein
the second end of the castor body has two opposite sidewalls each formed with a fixing hole connected to the mounting chamber to fix the pivot pin and an arcuate guide slot connected to the mounting chamber to guide movement of the braking pin;
the drive member of the brake unit has a first end formed with a pressing portion protruding outwardly from the mounting chamber of the castor body, a second end formed with a fixing bore to fix the braking pin and a mediate portion form with a pivot bore located between the pressing portion and the fixing bore and pivotally mounted on the pivot pin.

11. The castor of claim 10, wherein
the second end of the drive member has an end face formed with an arcuate push portion and a concave receiving portion located beside the push portion;
the drive member of the brake unit is movable upward relative to the castor body to a first position where the braking pin is movable downward to detach from one of the locking grooves of each of the rollers to unlock each of the rollers of the wheel unit from the castor body, while the push portion of the drive member abuts and pushes a ramp of the sliding block to move the sliding block toward the positioning block, so that the positioning block is movable downward relative to the castor body by an oblique movement between the oblique slideway of the sliding block and the respective oblique slide of the positioning block, and the locking pin of the positioning block is detached from one of the locking holes of the locking member to unlock the positioning block of the brake unit and the castor body from the locking member of the suspension unit;
the drive member of the brake unit is movable downward relative to the castor body to a second position where the braking pin is movable upward into one of the locking grooves of each of the rollers to lock each of the rollers of the wheel unit onto the castor body, while the sliding block of the brake unit is driven by a restoring force of the biasing member to move outwardly relative to the positioning block, and the ramp of the sliding block is movable to abut the receiving portion of the drive member, so that the positioning block is movable upward relative to the castor body by an oblique movement between the oblique slideway of the sliding block and the respective oblique slide of the positioning block, and the locking pin of the positioning block is movable into one of the locking holes of the locking member to lock the positioning block of the brake unit and the castor body onto the locking member of the suspension unit.

12. The castor of claim 11, wherein the castor body 1 is formed with an elastic positioning plate extending into the mounting chamber to position the drive member of the brake unit temporarily.

13. The castor of claim 12, wherein
the positioning plate of the castor body has a distal end formed with an arcuate positioning recess;
the second end of the drive member is formed with a positioning portion located beside the receiving portion;
the positioning portion of the drive member is movable to detach from the positioning recess of the positioning plate to unlock the drive member of the brake unit from the positioning plate of the castor body;
the positioning portion of the drive member is movable into the positioning recess of the positioning plate to lock the drive member of the brake unit onto the positioning plate of the castor body.

14. The castor of claim 8, wherein the suspension unit further includes an upper bearing mounted on the fixing bolt of the suspension unit and located between a stepped upper end of the rotation hole of the castor body and a stepped upper end of the fixing bolt of the suspension unit, a lower bearing mounted on the fixing bolt of the suspension unit and having a first side abutting a stepped lower end of the rotation hole of the castor body, a nut screwed onto a threaded lower end of the fixing bolt to retain the castor body on the fixing bolt of the suspension unit, and a washer mounted on the fixing bolt of the suspension unit and located between a second side of the lower bearing and the nut.

15. The castor of claim 8, wherein the castor body has a side formed with a passage connected to the mounting chamber to allow passage of the positioning block.

16. The castor of claim 8, wherein the mounting chamber of the castor body is connected to the mounting hole of the mounting post.

17. The castor of claim 8, wherein
the fixing bolt of the suspension unit extends through the locking member which is located between the fixing bolt and the mounting post of the castor body;
the mounting post of the castor body is located under the locking member of the suspension unit.

18. The castor of claim 1, wherein the fixing bolt has a top formed with a substantially L-shaped support bracket.

19. The castor of claim 1, wherein the positioning block of the brake unit has a substantially inverted U-shaped cross-sectional profile.

20. The castor of claim 1, wherein
the fixing bolt has a stepped upper end abutting a top of the castor body;
the suspension unit further includes a substantially C-shaped snap ring snapped onto a lower end of the fixing bolt and abutting a bottom of the castor body to attach the castor body to the fixing bolt.

* * * * *